May 7, 1957  L. C. PETERSON ET AL  2,791,258
TUBELESS TIRE
Filed Aug. 13, 1954

INVENTORS
LESTER C. PETERSON
HARVEY J. BATTS
BY
Robert J. Patterson
ATTORNEY

United States Patent Office 2,791,258
Patented May 7, 1957

2,791,258

TUBELESS TIRE

Lester C. Peterson and Harvey J. Batts, Indianapolis, Ind., assignors to United States Rubber Company, New York, N. Y., a corporation of New Jersey Application August 13, 1954, Serial No. 449,692

4 Claims. (Cl. 152—330)

This invention relates to a novel air retaining element for a pneumatic rubber tire, such as an air retaining liner for a tubeless tire or an innertube for a conventional tire.

This application is a continuation-in-part of our co-pending application Serial No. 301,432, filed July 29, 1952, now abandoned. That application (Serial No. 301,432) is directed to a similar air retaining element for a pneumatic rubber tire wherein the element is formed of a continuous body of a vulcanized mixture comprising Butyl rubber reclaim and an elastomer selected from the group consisting of natural rubber and butadiene-styrene rubbery copolymer in relative proportions of from 55 to 70% of rubber hydrocarbon furnished by said Butyl rubber reclaim and correspondingly from 45 to 30% of said selected elastomer, said percentages being based on the sum of the weights of rubber hydrocarbon furnished by said Butyl rubber reclaim and said selected elastomer.

Figure 1:
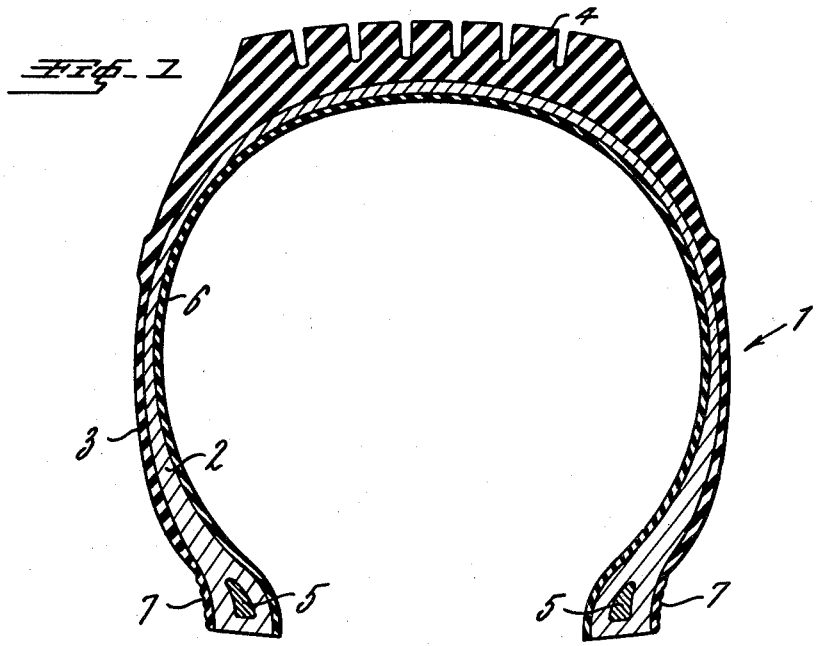
Fig. 1 is a cross-sectional view of a pneumatic rubber tire of the tubeless type embodying a liner made in accordance with our invention.

Our invention is based upon the discovery that important new results and advantages are achieved by forming air retaining elements for pneumatic rubber tires, specifically liners for tubeless tires and inner tubes of conventional type, from a vulcanized mixture of Butyl rubber reclaim and either natural rubber or butadiene-styrene rubbery copolymer (GR–S). More specifically, we have found that the new results and advantages hereinafter described are achieved by forming such air retaining elements from a mixture of Butyl rubber reclaim and natural rubber or GR–S in relative proportions of from 30 to 70% of rubber hydrocarbon supplied by the Butyl rubber reclaim and correspondingly from 70 to 30% of natural rubber or GR–S, these percentages being by weight based on the sum of the rubber hydrocarbon supplied by the Butyl rubber reclaim and the natural rubber or GR–S.

In particular, we have found that by employing Butyl rubber reclaim in conjunction with natural rubber or GR–S in the foregoing proportions the air holding properties of the resulting retainer are far superior to those of air retaining elements made entirely from natural rubber or GR–S or a mixture of both. In fact the air retention properties of tubeless tire liners or inner tubes made in accordance with our invention are almost as good as those of conventional liners or inner tubes in which the rubber is composed solely of Butyl rubber compounded and vulcanized in the ordinary way. In addition, inner tubes made in accordance with our invention are free from the cold buckling deficiency of all-Butyl rubber inner tubes. This is an important advantage because the problem of cold buckling with all-Butyl rubber inner tubes is extremely serious in the northern portions of the United States and in Canada.

The second rubber component used in our invention, i. e., the natural rubber or GR–S, can consist of virgin natural rubber or GR–S, or of mixtures of reclaimed and virgin natural rubber or GR–S, or can consist entirely of reclaimed natural rubber or GR–S.

In manufacturing air retaining elements in accordance with our invention we simply follow conventional factory procedures except that in place of the usual rubber formulation we employ a formulation in which the rubber component comprises Butyl rubber reclaim and natural rubber or GR–S in the relative proportions specified above. In the preferred practice of our invention, the natural rubber or GR–S component consists of virgin natural rubber, i. e., Hevea rubber, or virgin GR–S, respectively, although if desired a minor proportion thereof, say not over 25% thereof, can be replaced with an equivalent amount of natural rubber reclaim or GR–S reclaim.

The Butyl rubber reclaim and the natural rubber or GR–S are completely compatible with one another. In the practice of our invention, we typically simply mill the Butyl rubber reclaim and the natural rubber or GR–S together, adding conventional compounding ingredients, typically including suitable proportions of rubber-reinforcing carbon black, sulfur in amount sufficient to vulcanize the resulting mixture, accelerators of vulcanization, and activators of acceleration, especially a mixture of zinc oxide and fatty acid, e. g. stearic acid, or zinc soap, e. g., zinc stearate or zinc laurate.

The proportion of reinforcing carbon black employed will usually range from 20 to 60 parts per 100 parts of rubber hydrocarbon, i. e. hydrocarbon supplied by the Butyl rubber reclaim and the natural rubber or the GR–S. The proportion of sulfur may vary somewhat with variations in the proportion of natural rubber or GR–S, typically ranging from 1.0 to 2.5 parts per 100 parts of natural rubber or GR–S. The amount of zinc oxide will usually run from 3 to 10 parts and the amount of stearic acid will generally range from 1 to 4 parts per 100 parts of natural rubber or GR–S. Zinc laurate may also be used, typically in amounts ranging from 1 to 6 parts.

An intimate mixture of the two types of rubber and the compounding ingredients is made in any suitable manner, as on an open rubber mill or in a Banbury mixer, after which the mixture is shaped into a continuous body having the desired final form whereupon this body is vulcanized in any conventional manner. Details of the manufacturing method need not be given because the steps are all well known and conventional. It may be stated however, that tubeless tires embodying a liner made in accordance with our invention are customarily made by assembling them with the unvulcanized liner element adjacent the innermost rubber-coated fabric ply of the tire carcass (this ply usually being coated on both sides with natural rubber or GR–S or a mixture thereof) after which the assembly is vulcanized in the usual way so as to vulcanize all of the elements of the tire including the liner element.

Our invention is based upon our discovery that vulcanized mixtures of Butyl rubber reclaim and natural rubber or GR–S in the above-mentioned proportions have physical properties which are more than adequate to meet the service conditions encountered by the liner or inner tube in use, and at the same time have air retaining properties nearly as good as all-virgin Butyl rubber air retaining elements.

Referring to the drawing, Fig. 1 portrays a pneumatic tire casing 1 comprised of a multi-ply rubberized fabric carcass 2 having overlying rubber sidewall and tread portions 3 and 4, respectively. Inextensible bead assemblies 5 are incorporated in the lower marginal portions of the carcass. A liner element 6, formed of a mixture of natural rubber or GR-S and Butyl reclaim in accordance with our invention, is securely attached to the entire inner portion of the carcass, preferably by vulcanization in situ while being pressed against the innermost rubberized fabric layer of the carcass during vulcanization of the tire in the factory. Preferably the outer sidewall portion of the bead is formed with a plurality of circumferential ridges 7 which aid in insuring a truly air-tight sealing against the wheel rim. If desired, auxiliary sealant means, in addition to ridges 7, can be provided to seal the tire with respect to the rim but neither ridges 7 nor such auxiliary sealant means constitute any part of our invention.

By reason of the complete compatibility of the stock used in the liner of our invention and the rubber stock used in the assembly of the tire carcass, an integral union of our liner with the rubber layer over the entire inside portion of the tire carcass is effected during the vulcanization. This effects a remarkably good adhesion of our liner to the tire carcass and greatly simplifies the manufacture of tubeless tires having a liner with excellent air retention properties.

Figure 3:
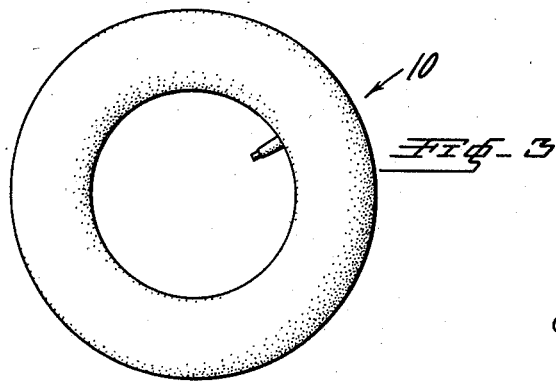
Fig. 3 shows in elevation a pneumatic tire inner tube embodying our invention.

In Fig. 3 reference numeral 10 denotes an inner tube made in accordance with our invention. This inner tube is of conventional annular shape and need not be described in further detail.

The following examples illustrate our invention in more detail. All parts and percentages expressed herein are by weight.

*Example 1*

Liners for tubeless tires, and inner tubes, were made from the following formulation:

| | Parts |
|---|---|
| #1 smoked sheet | 40.00 |
| Butyl rubber reclaim [1] | [2] 109.00 |
| Zinc oxide | 3.00 |
| Stearic acid | 1.00 |
| "Laurex" (zinc laurate) | 2.00 |
| Easy processing channel black | 25.00 |
| Mineral oil (viscosity 160-180 Saybolt at 100° F.) | 5.00 |
| Benzothiazyl disulfide | 0.35 |
| Tetramethyl thiuram monosulfide | 0.10 |
| Sulfur | 0.75 |

[1] Had the following analysis:
Sp. gr. _____ 1.16
Elongation _____percent__ 550
Tensile _____p. s. i__ 1400
Acetone extract _____percent__ 4
Ash _____do____ 12
Carbon black _____do____ 26
Rubber hydrocarbon _____do____ 55
[2] 60 parts rubber hydrocarbon.

These ingredients were mixed together and shaped in the ordinary way after which the liner or inner tube was formed therefrom, whereupon the tire embodying the liner, or the inner tube, was vulcanized in the conventional manner. The resulting liners and inner tubes exhibited air holding properties almost as good as a conventional all-virgin Butyl rubber inner tube.

*Example 2*

Figure 2:
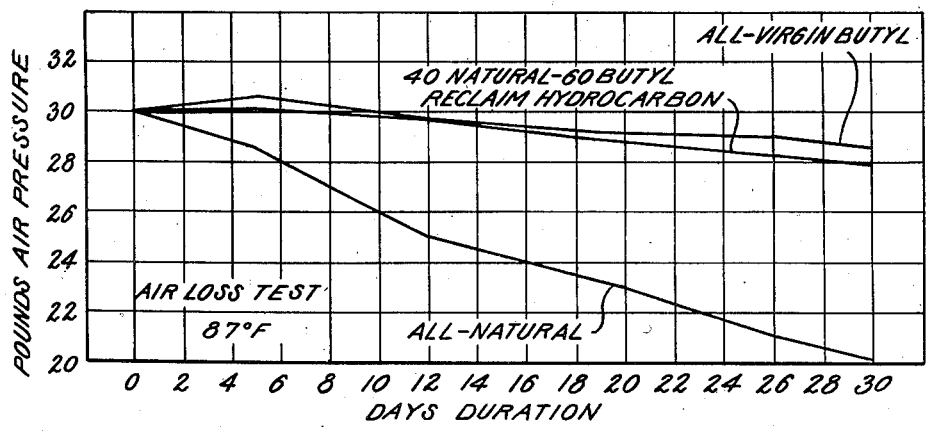
Fig. 2 is a graphical portrayal of the air retention properties of an inner tube made in accordance with our invention and inner tubes made by prior practice.

An indication of the remarkable air retention properties of air retainers made in accordance with our invention is given by reference to Fig. 2 which is a graphical portrayal of the loss of air pressure in inner tubes made in accordance with our invention, compared with inner tubes made by conventional practice. The data plotted in Fig. 2 was obtained as follows: A stock was first prepared according to the following formulation:

| | Parts |
|---|---|
| #1 smoked sheet | 40.00 |
| Butyl rubber reclaim (same as in Example 1) | 109.00 |
| Fast-extruding furnace black | 10.00 |
| Semi-reinforcing furnace black | 15.00 |
| Zinc oxide | 3.00 |
| Stearic acid | 1.00 |
| Benzothiazyl disulfide | 0.35 |
| Sulfur | 0.75 |

The foregoing formulation was mixed, shaped into inner tubes, and cured 5 minutes at 320° F. The resulting inner tubes (II) were tested for air retention properties in tube tire assemblies along with regular production all-virgin Butyl inner tubes (I), and all natural rubber inner tubes (III). The natural rubber stock which was used had air holding properties considerably superior to an all-virgin natural rubber stock because of a substantial content of natural rubber reclaim. The results of a 30 day air retention test are given in the following table. The figures are inflation pressures in pounds per square inch.

| Days Test | 0 | 5 | 12 | 19 | 26 | 30 |
|---|---|---|---|---|---|---|
| *Tube* | | | | | | |
| I. Regular Production All-Virgin Butyl Tube | 30 | 30.5 | 29.7 | 29.2 | 29.1 | 28.65 |
| II. Tube Made from 60 Pts. Butyl Reclaim Hydrocarbon and 40 Pts. Natural Rubber | 30 | 30.0 | 29.6 | 29.0 | 28.3 | 27.90 |
| III. Tube Made from All-Natural Rubber (including Natural Reclaim) | 30 | 28.5 | 24.9 | 23.15 | 21.07 | 20.10 |

These figures are plotted in Fig. 2 of the drawing. The great superiority of the inner tube made in accordance with the present invention over an all-natural rubber inner tube is clearly evident. It will be seen that the inner tube of the present invention was nearly as good in air retention as a regular production all-virgin Butyl tube.

*Example 3*

Liners for tubeless tires were made in the manner described above, from a 40 GR-S-60 Butyl reclaim stock having the following formulation:

| | Parts |
|---|---|
| GR-S 101 | 40.00 |
| Butyl rubber reclaim (same as in Example 1) | 109.00 |
| Zinc oxide | 3.00 |
| Stearic acid | 1.00 |
| "Laurex" (zinc laurate) | 2.00 |
| Mineral oil (viscosity 160-180 Saybolt at 100° F.) | 5.00 |
| Benzothiazyl disulfide | .50 |
| Tetramethyl thiuram monosulfide | .20 |
| Sulfur | .75 |
| Easy processing channel black | 25.00 |

The resulting tubeless tires were very satisfactory in all respects, particularly in air retention properties.

*Example 4*

Tubeless tires were constructed with liners made of a 60 Butyl reclaim—40 natural rubber reclaim stock having the following formulation:

| | Parts |
|---|---|
| Natural rubber reclaim [1] | [2] 68.00 |
| Butyl rubber reclaim (same as in Example 1) | 109.00 |

[1] A neutral black natural rubber tube reclaim analyzing as follows:
Sp. gr. _____ 1.20
Extract _____percent__ 9
Ash _____do____ 20
Carbon black _____do____ 10
Rubber hydrocarbon _____do____ 58
Tensile _____p. s. i__ 1250
Elongation at break _____percent__ 600
[2] 40 parts hydrocarbon.

| | Parts |
|---|---|
| Fast-extruding furnace black | 10.00 |
| Semi-reinforcing furnace black | 15.00 |
| Zinc oxide | 3.00 |
| Stearic acid | 1.00 |
| Benzothiazyl disulfide | 0.35 |
| Sulfur | 2.00 |

Ordinary mixing and compounding techniques were used. The mode of forming the liners was that described above. The resulting liners were very satisfactory in all respects including air retention.

Example 4 clearly demonstrates the feasibility of completely replacing virgin natural rubber with reclaimed natural rubber.

*Example 5*

Tubeless tires were constructed with liners made of a 35 Butyl reclaim—65 natural rubber stock having the following formulation:

| | Parts |
|---|---|
| #1 smoked sheet | 65.00 |
| Butyl rubber reclaim (containing 55% rubber hydrocarbon) | 63.63 |
| "Indopol H-300" [1] | 10.00 |
| "Philblack O" (high abrasion furnace black) | 50.00 |
| Zinc oxide | 5.00 |
| Stearic acid | 1.40 |
| "Monex" (tetramethyl thiuram monosulfide) | 0.35 |
| Sulfur | 0.65 |

[1] A non-migratory plasticizer consisting of polybutenes of relatively low molecular weight and having the following properties:

| | |
|---|---|
| Mean molecular weight | 940 |
| Sp. gr. 60°/60° F | 0.894 |
| Flash point (Tag.), °F | 505 |
| ASTM pour point, °F | plus 35 |
| Viscosity, S. E. sec. at 210° F | 3330 |
| Refractive index (20/d) | 1.4959 |
| Iodine No | 32 |

Ordinary mixing and compounding techniques were used. The mode of forming the liners was that described above.

Samples of the liner stock of this example were cured at 350° F. and physical properties of the vulcanizates were determined. Other samples were cured while in contact with an uncured conventional natural rubber stock of the type used for coating tire cords after which the adhesion of the liner stock to the cord coating stock was determined. The data were as follows:

| | Cure at 320° F. | |
|---|---|---|
| Tensile (p. s. i.) | 10' | 1,460. |
| | 20' | 1,470. |
| Elongation (%) | 10' | 470. |
| | 20' | 500. |
| 300% Modulus (p. s. i.) | 10' | 875. |
| | 20' | 830. |
| 500% Modulus (p. s. i.) | 10' | |
| | 20' | 1,470. |
| Hardness (Shore) | 10' | 55. |
| | 20' | 55. |
| Adhesion to conventional natural rubber tire cord coat stock at 250° F. Scott Tester with jaws separating at 20 inches/minute. | 20' | 15 to 18 lbs./inch. |

| | Kilocycles | Hole Size Inches |
|---|---|---|
| De Mattia Flex (punctured) [1] | 20' | |
| | 20 | .03 |
| | 80 | .09 |
| | 100 | .12 |
| | 160 | .21 |
| | 200 | .31 |

[1] ASTM D-813-44T, 0.50 inch puncture hole growth considered failure.

The air permeability characteristics of samples of vulcanized liner stocks of Example 5 were determined. These vulcanizates exhibited an air retention equal to about three times that of a conventional vulcanized natural rubber inner tube stock.

A very important advantage of liners for tubeless tires made in accordance with our invention is that they present no problem of adhesion to the ordinary rubber-coated innermost ply of the tire carcass. The adhesion of liners made in accordance with our invention to such rubber-coated plies is remarkably good, so good in fact that if the liner is pulled away from the tire carcass it frequently strips the rubber from the innermost fabric ply of the tire leaving exposed cord. This feature of our invention is highly advantageous because it provides a simple solution to the problem of adhesion of liners in tubeless tires to the interior of the tire, while making possible air retention properties closely approaching those of all-virgin Butyl rubber liners. In U. S. patent to Antonson 2,587,428 the problem of adhesion of an all-Butyl liner was solved by rubberizing only the outer side of the innermost ply of cord, leaving the inner side thereof uncoated so that during vulcanization the Butyl liner adhered directly to the uncoated innermost fabric ply. By the practice of our invention resort to such means for obtaining the necessary bond between the liner and the tire carcass is obviated. In practicing our invention we use the ordinary tire carcass construction comprising a plurality of layers of tire cord all of which have been rubberized on both sides with natural rubber or GR–S or a mixture thereof, and adhesion of our liner to such rubberized fabric presents no problem whatever, apparently because of the fact that the rubber mixture used in our invention is completely compatible with natural rubber or GR–S or mixtures thereof, whereas Butyl rubber is incompatible with natural rubber or GR–S.

Proportions of Butyl rubber reclaim hydrocarbon less than 30% are not satisfactory because of inadequate air retention properties. Proportions above 70% of Butyl rubber reclaim hydrocarbon based on total rubber content are not satisfactory because the physical properties are adversely impaired at such levels.

The term "Butyl rubber" is used herein in its ordinary sense to denote a sulfur-vulcanizable copolymer of a major proportion of isobutylene and a minor proportion of a multi-olefinic unsaturate having from 4 to 14 carbon atoms per molecule, the multi-olefinic unsaturate usually being an aliphatic conjugated diolefin hydrocarbon having from 4 to 6 carbon atoms per molecule, typically isoprene or butadiene, the proportions of combined monomers in the copolymer usually ranging from 90 to 99.5% of isobutylene and correspondingly from 10 to 0.5% of the multi-olefinic unsaturate.

The term "Butyl rubber reclaim" is used herein in its ordinary sense to denote a material which, as is well-known in the rubber art, is made by treating vulcanized Butyl rubber in such a way as to cause it to be devulcanized and attain a sufficiently plastic state to enable its re-use in making vulcanized rubber articles. As is well-known, Butyl rubber reclaim is commonly made by heating ground Butyl rubber vulcanizate with water or steam in the presence of a reclaiming oil until it is softened and rendered sufficiently plastic to be re-used like virgin rubber, after which it is sheeted out ready for sale. An example of such a process is shown in Randall U. S. Patent 2,545,828. Butyl rubber reclaim is a standard article of commerce and the method of making it is well-known and constitutes no part of the present invention.

The term "Butyl rubber reclaim hydrocarbon" as used herein denotes the rubber hydrocarbon furnished by the Butyl rubber reclaim, and does not include any hydrocarbon oil or other non-rubber hydrocarbon component of the reclaim.

The terms "natural rubber," "GR–S," and "butadiene-styrene rubbery copolymer" as used herein and in the appended claims include either virgin or reclaimed materials or mixtures of virgin and reclaimed materials, unless otherwise indicated by the context.

From the foregoing description, many advantages of the present invention will be readily apparent to those skilled in the art. The principal advantage is that we provide an air retaining element having air retention properties closely approaching those of the best all-Butyl rubber air retaining element thus far available. At the same time however, the air retaining element of our invention is not subject to the deficiencies of all-Butyl rubber air retaining elements. Perhaps the most important advantage of our invention is that in the case of a tubeless tire we obtain remarkable adhesion of the liner to the rubberized tire carcass. As mentioned above, the adhesion of liners of our invention to the rubberized interior of the tire carcass is extraordinary. In this way, as explained above, we obviate the serious problem of adhesion of all-Butyl rubber liners to the inside of the tire carcass. Thereby we greatly simplify the manufacture of tubeless tires and at the same time we obtain the great advantages of air retention properties almost as good as an all-Butyl rubber liner. Another very important advantage is that the stocks used in our invention handle in the manner resembling ordinary natural rubber or GR-S stocks. Numerous other advantages will be apparent to those skilled in the art.

Having thus described our invention, what we claim and desire to protect by Letters Patent is:

1. A vulcanized tubeless pneumatic rubber tire comprising a multi-ply rubberized fabric carcass with surrounding side-wall and tread portions and having an interior air retaining liner secured directly to its innermost ply by vulcanization in situ, said liner being formed of a continuous body of a vulcanized mixture comprising a reclaim of a rubbery copolymer of a major proportion of isobutylene and a minor proportion of an aliphatic conjugated diolefin hydrocarbon having from 4 to 6 carbon atoms per molcule and an elastomer selected from the group consisting of natural rubber and butadiene-styrene rubbery copolymer in relative proportions of from 55 to 70 percent of rubber hydrocarbon furnished by said reclaim and correspondingly from 45 to 30% of said selected elastomer, said percentages being based on the sum of the weights of rubber hydrocarbon furnished by said reclaim and said selected elastomer, said reclaim having been made by heating a vulcanized rubbery copolymer of a major proportion of isobutylene and a minor proportion of an aliphatic conjugated diolefin hydrocarbon having from 4 to 6 carbon atoms per molecule in the presence of a reclaiming oil until said copolymer is sufficiently plastic to enable it to be sheeted out and re-used like virgin rubber in making vulcanized rubber articles.

2. A tire as recited in claim 1 wherein said mixture contains from 20 to 60 parts of carbon black per 100 parts of rubber hydrocarbon furnished by said reclaim and said selected elastomer.

3. A vulcanized tubeless pneumatic rubber tire comprising a carcass formed with plies of fabric coated with rubber selected from the group consisting of natural rubber and butadiene-styrene rubbery copolymer, said carcass having surrounding side-wall and tread portions, the innermost ply of fabric being coated on its inside face with rubber selected from said group, and an interior air retaining liner integrally secured to and coalesced with the inner rubber coating on said innermost ply by vulcanization in situ, said liner being formed of a continuous body of a vulcanized mixture comprising a reclaim of a rubbery copolymer of a major proportion of isobutylene and a minor proportion of an aliphatic conjugated diolefin hydrocarbon having from 4 to 6 carbon atoms per molecule and an elastomer selected from the group consisting of natural rubber and butadiene-styrene rubbery copolymer in relative proportions of from 55 to 70% of rubber hydrocarbon furnished by said reclaim and correspondingly from 45 to 30% of said selected elastomer, said percentages being based on the sum of the weights of rubber hydrocarbon furnished by said reclaim and said selected elastomer, said reclaim having been made by heating a vulcanized rubbery copolymer of a major proportion of isobutylene and a minor proportion of an aliphatic conjugated diolefin hydrocarbon having from 4 to 6 carbon atoms per molecule in the presence of a reclaiming oil until said copolymer is sufficiently plastic to enable it to be sheeted out and re-used like virgin rubber in making vulcanized rubber articles.

4. A vulcanized tubeless pneumatic rubber tire comprising a carcass formed with plies of fabric coated with rubber selected from the group consisting of natural rubber and butadiene-styrene rubbery copolymer, said carcass having surrounding side-wall and tread portions, the innermost ply of fabric being coated on its inside face with rubber selected from said group, and an interior air retaining liner integrally secured to and coalesced with the inner rubber coating on said innermost ply by vulcanization in situ, said liner being formed of a continuous body of a vulcanized mixture comprising a reclaim of a rubbery copolymer of a major proportion of isobutylene and a minor proportion of an aliphatic conjugated diolefin hydrocarbon having from 4 to 6 carbon atoms per molecule and natural rubber in relative proportions of from 55 to 70% of rubber hydrocarbon furnished by said reclaim and correspondingly from 45 to 30% of natural rubber, said percentages being based on the sum of the weights of rubber hydrocarbon furnished by said reclaim and natural rubber, said reclaim having been made by heating a vulcanized rubbery copolymer of a major proportion of isobutylene and a minor proportion of an aliphatic conjugated diolefin hydrocarbon having from 4 to 6 carbon atoms per molecule in the presence of a reclaiming oil until said copolymer is sufficiently plastic to enable it to be sheeted out and re-used like virgin rubber in making vulcanized rubber articles.

References Cited in the file of this patent

UNITED STATES PATENTS

| | | |
|---|---|---|
| 2,332,194 | Beekley | Oct. 19, 1943 |
| 2,418,250 | Drake | Apr. 1, 1947 |
| 2,467,322 | Lightbown et al. | Apr. 12, 1949 |
| 2,541,550 | Sarbach et al. | Feb. 13, 1951 |
| 2,545,828 | Randall | Mar. 20, 1951 |
| 2,557,642 | Dudley | June 19, 1951 |
| 2,575,249 | Connell et al. | Nov. 13, 1951 |
| 2,578,001 | Cubberley et al. | Dec. 11, 1951 |
| 2,583,387 | Morrissey et al. | Jan. 22, 1952 |
| 2,587,470 | Herzegh | Feb. 26, 1952 |
| 2,592,724 | O'Neil | Apr. 15, 1952 |
| 2,635,975 | Peters | Apr. 21, 1953 |

FOREIGN PATENTS

| | | |
|---|---|---|
| 512,948 | Belgium | Aug. 14, 1952 |
| 1,020,822 | France | Nov. 26, 1952 |

(Corresponding U. S. Sarbach 2,676,636, Apr. 27, 1954)

OTHER REFERENCES

"Butex for Light and Ozone Resistance," Midwest Rubber Reclaiming Co., Report #12, June 1, 1949.

"Modern Rubber Chemistry" (Barron); published by D. Van Nostrand Co. (1948), pages 281–290.